2 Sheets—Sheet 1.

S. DARLING.
Art of Manufacturing Mathematical Instruments.
No. 233,488.      Patented Oct. 19, 1880.

Witnesses.
Benjamin Gridley
Geo. H. Smith

Inventor.
Samuel Darling

2 Sheets—Sheet 2.

S. DARLING.
Art of Manufacturing Mathematical Instruments.

No. 233,488.  Patented Oct. 19, 1880.

Witnesses.
Benjamin Gridley.
Geo. H. Smith

Inventor.
Samuel Darling

N. PETERS, PHOTO-LITHOGRAPHER, WASHINGTON, D. C.

UNITED STATES PATENT OFFICE.

SAMUEL DARLING, OF PROVIDENCE, RHODE ISLAND.

ART OF MANUFACTURING MATHEMATICAL INSTRUMENTS.

SPECIFICATION forming part of Letters Patent No. 233,488, dated October 19, 1880.

Application filed December 15, 1879.

*To all whom it may concern:*

Be it known that I, SAMUEL DARLING, a citizen of the United States, residing at Providence, in the county of Providence and State of Rhode Island, have invented a new and useful Improvement in the Art of Manufacturing Mathematical Instruments and other articles of mechanism which require great accuracy in their construction, of which the following is a specification.

The object of my invention is to keep both the articles being manufactured and the leading parts of the manufacturing-machine, upon which the accuracy of the work depends, at the same degree of temperature during the process of manufacturing, for the purpose of obtaining greater accuracy in the articles manufactured.

My invention relates more especially to the manufacture of standard metallic screws, graduated measures of length, instruments having circular graduations, straight-edges, and standard gages; but it is applicable also to the manufacture of any article which requires the same conditions in relation to the temperature during the manufacturing process; and it consists in the application of currents of air generated by a blowing apparatus and conducted by air-tubes upon the article being manufactured, and upon the leading parts of the manufacturing-machine, upon which the accuracy of the work depends, during the process of manufacturing.

Figure 1:
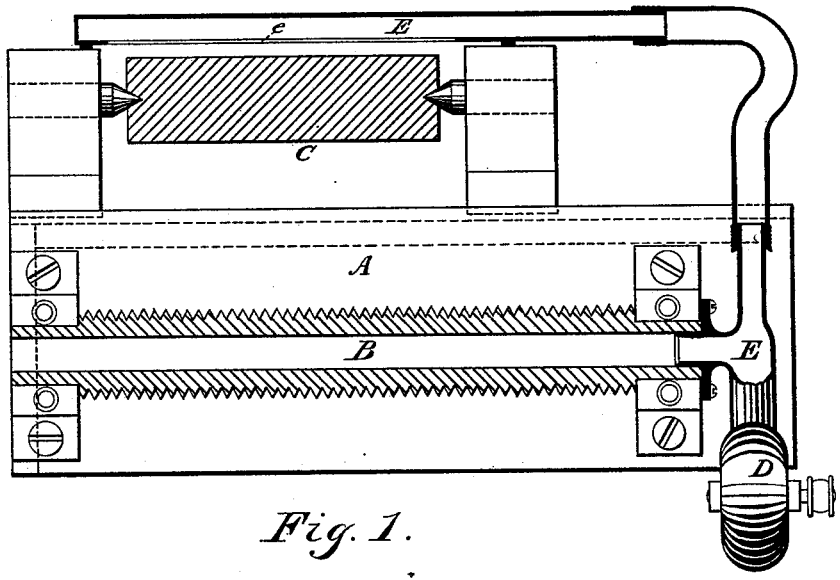

For example, when my improvement is employed in a lathe for manufacturing a screw, Figure 1, currents of air are to be applied to the leading-screw of the lathe, to the piece being made into a screw, and generally to the spindle of the lathe-head, centers, and ways of the lathe. When employed in a dividing-engine, Fig. 2, for graduating rules, the air is applied to the leading-screw of the engine, to the rule being graduated, and to any other parts of the engine in which a variation of temperature would affect the accuracy of the work. When it is employed in a grinding-machine, Fig. 3, the air is applied to the article being ground and the ways that the bed slides upon, to keep them of the same temperature throughout, and it is applied to any part of the machine to which it may be necessary to obtain the accuracy required. When employed in a circular dividing-engine, Fig. 4, the air is applied to the piece being divided, to the bed upon which it rests, and upon such other parts of the machine as the accuracy of the operation may require; and when employed in a planing-machine, Fig. 5, the air is to be applied to the ways of the planer and the piece being planed, to keep them of a uniform temperature during the process of planing.

My invention in no way relates to keeping cool cutters and turning-tools for turning and shaping metals to make them do more work; neither is it for preventing the bearings of machinery from becoming overheated any further than is required for keeping the work and the parts of the machine upon which the accuracy of the work depends of the proper temperature; neither does it relate to discharging dust from grinding-machines, or anything of the kind.

It is not often necessary to have the air of any particular degree of temperature; but there will be some cases where it will be required. Such a case would be when the thread of a brass screw was to be cut in a lathe having a steel or iron leading-screw. In that case the air should be at the degree of temperature at which the leading-screw of the lathe is standard length, if it be desired to have the brass screw standard length at the same degree, as it is well known to those familiar with the subject that brass is changed nearly twice as much by every degree of heat as steel is.

If a steel screw is to be cut in a lathe having a steel leading-screw, it is immaterial at what temperature the work is done, provided the temperature of the screw being cut and that of the leading-screw be the same throughout.

The currents of air may be made and kept at any degree of temperature desired in any of the known ways of accomplishing that purpose; but I do not claim in this application any method of changing the temperature of the air before or as it passes through the blowing apparatus, Letters Patent covering that invention having been already granted me.

It is well known to mechanists that the sudden changes of temperature are one of the greatest obstacles in the way of obtaining satisfactory and uniform results in the manufacture of accurate tools and instruments. Take, for example, the manufacture of metallic standard screws. As soon as the screw-cutting engine is put in motion the friction upon the leading-screw causes an increase in its temperature, which, of course, changes its pitch, and so with the blank, while the thread is being cut, the cutting process causes heat, which expands the blank. At no stage of the process can the workman depend upon the temperature of the blank and the screw as being the same. This obstacle is met with in almost every mechanical operation where great accuracy is wanted.

I have illustrated by drawings a sufficient number of machines to which my invention is applicable to make it clearly understood.

In the drawings, Figure 1 is a side elevation of parts of a screw-cutting lathe embracing my improvement.

A represents the frame-work; B, the screw, which is preferably made hollow for a current of air to pass through to regulate its temperature when in operation; C, a metallic bar of which a screw is to be made; D, a fan-blower; E, a pipe connected with the blower D to convey a current of air through the screw B; e, aperture through which the air passes out of pipe E.

The currents of air which are forced through screw B and upon the bar C, and also upon the running parts of the lathe, will keep them all of the same temperature during the process of cutting the thread on the bar, and the pitch of the new screw thus made will be the same as the pitch of the leading-screw B, which, it is obvious, would not be the case had not bar C and screw B been kept of the same temperature during the process of cutting the thread.

The blank C being thirty-six inches long, and every degree of temperature changing it .000006 of its whole length, one degree difference in temperature from the leading-screw while the thread is being cut would cause an error of $\frac{1}{4629}$ of an inch.

Figure 2:
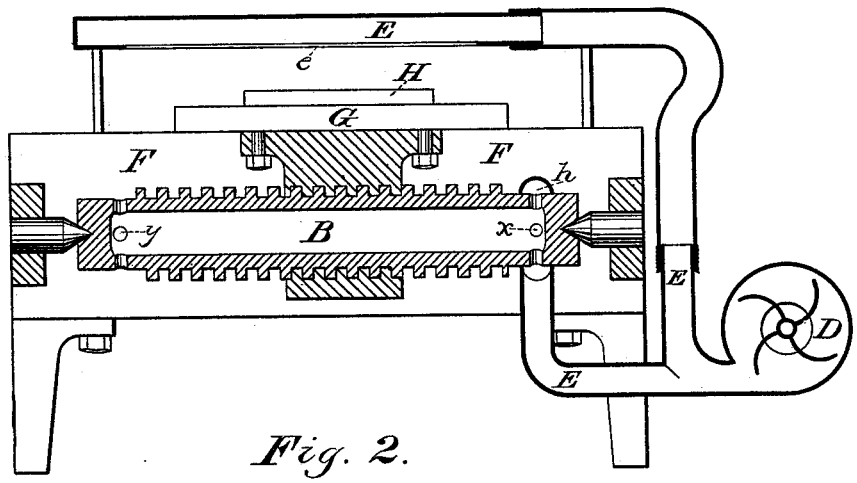

Fig. 2 represents a vertical longitudinal section of parts of a machine embracing my improvement for graduating lineal measures.

F represents the frame-work; G, the sliding plate upon which rest the articles to be graduated; B, a hollow steel screw by which motion is given to plate G; D, a fan-blower; E, a wind-pipe; e, aperture through which the air passes out of the pipe; H, steel bar to be graduated; h, circular air-reservoir fitted to the screw; X, opening from the air-reservoir to the inside of the screw; Y, opening at the opposite end of the screw for the exit of the air.

The screw being of standard length, the steel bar must be kept of the same temperature of the screw during the process of graduation, in order to make the graduations of standard length, and by passing a current of air through the screw and upon the steel bar and running parts of the machine during the process of graduating, no heat can be accumulated by friction from running the screw or other parts of the machine, or from engraving the lines on the bar, and, of course, no change in length; but it is obvious that without the current of air, the friction produced by the motion of the screw engraving the lines on the bar, the running parts of the machine, and the presence and manipulations of the operator would produce heat that would affect the temperature, so that it would be impossible to make the graduation on the bar of the exact length of the screw, or to keep the bar being graduated of the same temperature of the screw, or either of them of the same temperature throughout, which is required to make the graduations uniform.

Figure 3:
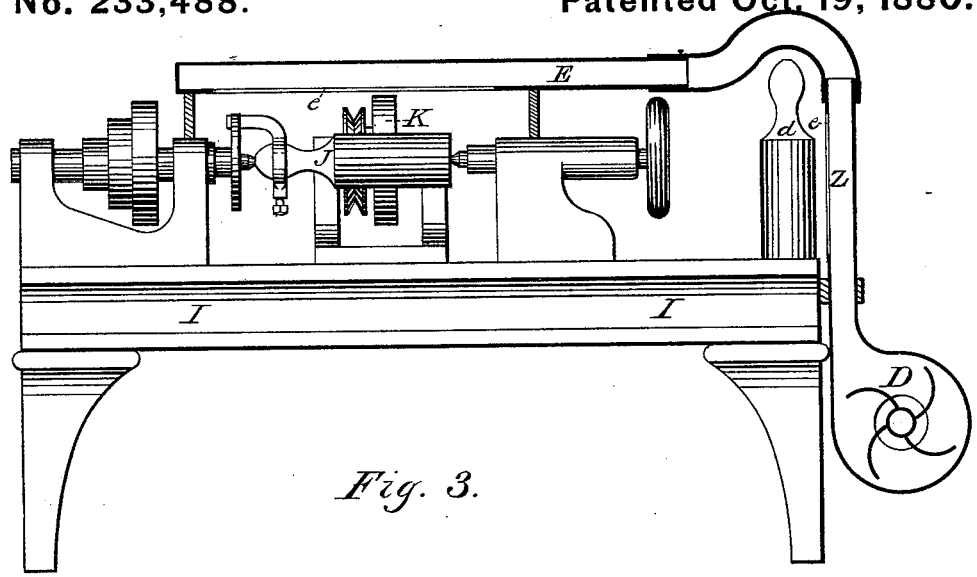

Fig. 3 is an elevation of parts of a grinding-machine embracing my improvement.

I represents the frame-work; J, a cylindrical gage in the process of being ground; K, a grinding-wheel; D, a fan-blower; d, standard gage, to the size of which gage J is to be ground; E, a wind-pipe; e, aperture in air-pipe through which the air passes out.

The grinding process causes the gage J to heat, and it is liable to expand irregularly, and it being expanded renders it difficult to compare it with the standard d without removing it from the machine and in some way bringing it to the exact temperature of the standard, which is a very slow and expensive process, and is liable to cause inaccuracies by removing it from the machine. When a current of air is thrown upon the gage while being ground it is kept of the same temperature of the standard, and the piece being ground can be compared to the standard with facility and without removing it from the machine.

Figure 4:
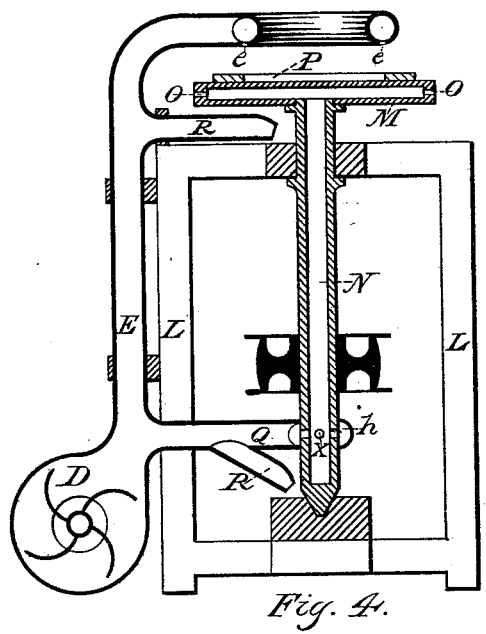

Fig. 4 is a vertical section of parts of a machine embracing my improvement for graduating circles.

L represents the frame-work; M, a revolving hollow table upon which rest articles to be graduated; N, a hollow spindle by which the table is supported and revolved; O, holes through the edge of the table for the escape of the air; P, article to be graduated; D, a fan-blower; E, air-pipe; e, outlet for the air; Q, branch air-pipe leading from pipe E to hollow spindle N; R, branch air-pipes leading to the bearings of the spindle.

The present state of the sciences requires greater accuracy in mathematical instruments than has hitherto been produced, and any advancement in that direction is of great importance. However perfect the graduating apparatus, unless the article being graduated and the apparatus be kept of uniform temperature during the process of graduating, the work will be defective.

By the application of my improvement, as above described, the table and the piece being graduated, together with all running parts of the machine, are made and kept of the same temperature throughout during the process of graduating, which produces uniformity and accuracy in the work.

Figure 5:
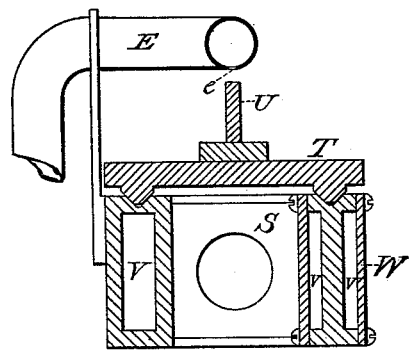

Fig. 5 is a transverse section of an iron-planer embracing my improvement.

S represents the frame-work and ways; T, the sliding plate; U, piece of iron to be planed; V, air-passages through the frame; W, casings on the frame to form the air-passages; E, air-pipe; e, aperture through which the air passes from the pipe to the piece of iron U.

It is obvious that in planing the thin upper part of the iron piece U it will heat and expand much more than the lower and larger part. Consequently, after being planed and all parts become of the same temperature, the upper part of the piece must be concave by contracting after it is finished; also, where the frame is very deep, as it must be for the ways to be straight, the friction caused by the motion of the plate will expand the upper part, which comes in contact with the plate and causes it to be convex; but when a current of air is applied the ways of the planer and the article being planed are kept of uniform temperature during the process of planing, and the piece planed will correspond with the ways of the planer.

I do not confine myself to any particular way of applying the current of air, as it may be applied in many different ways without departing from the principle of my invention.

Having fully explained my invention, I claim—

1. The hereinbefore-described improvement in the art of manufacturing mathematical instruments and other articles of mechanism, the same consisting in the application of currents of air to the article being manufactured and the parts of the manufacturing-machine upon which the accuracy of the work depends during the process of manufacturing, substantially as described, and for the purpose set forth.

2. The improved lathe or dividing-engine, Figs. 1 and 2, having a hollow leading-screw, jointly with the fan and the air-tubes E, for directing the currents of air into the screw and upon the work, substantially as described and shown.

SAMUEL DARLING.

Witnesses:
JOHN E. HALL,
HENRY DRURY.